Patented Apr. 3, 1951

2,547,206

UNITED STATES PATENT OFFICE 2,547,206

PASTRY PRODUCTS AND PREPARATION THEREOF

Nathaniel A. Hanau, Essex Fells, N. J.

No Drawing. Application June 3, 1950,
Serial No. 166,055

12 Claims. (Cl. 99—92)

This invention relates to pastries such as pies, tarts, turnovers and the like, and contemplates a novel pastry product, as well as the method of producing such a product, characterized by keeping qualities in the unbaked condition materially surpassing such qualities of similar pastry products produced in the conventional manner.

Pastry products such as pies, tarts and turnovers generally suffer a noticeable loss in freshness within about four to six hours after baking and this fact is largely responsible for the inferiority of bakery-made pies compared to pies freshly baked in the home. Noticeable deterioration is also evident in the case of unbaked pies and the like which are permitted to stand for similar periods before baking, such deterioration being due largely to the absorption by the pastry dough of moisture or other aqueous medium present in the pie filling in contact with the dough. Such deterioration in unbaked pies has thus far been a deterrent to the practice of producing an unbaked but otherwise complete pastry product in a commercial establishment and of distributing the unbaked product for baking on the consumer's premises. Freezing of unbaked pies has been found to preserve them until thawed, but this expedient has introduced the added expense of freezing and the difficulties and limitations inherent in distribution and storage of a frozen product.

I have now discovered that pastry products such as pies, tarts and turnovers can be so prepared as to resist deterioration in the unbaked condition by separating the unbaked dough and filling composition normally in contact with one another by a layer or coating of moisture-impervious edible material which is ultimately absorbed by the pastry dough or by the filling composition, or by both, in the course of subsequent baking. Conventional fillings for pastry products are characterized by a substantial moisture content. Pastry dough, on the other hand, is composed largely of flour and shortening in which only a relatively small amount of moisture can be tolerated if a satisfactory pastry crust is to be obtained. The undesirable absorption by the dough of moisture from the filling while the pastry product is in its completed but unbaked form is prevented in accordance with my invention by the interposition between the dough and the filling of a moisture-impervious layer of edible material.

Accordingly, my novel method of protecting unbaked pastry dough, composed essentially of dough paste, from deterioration resulting from contact with a pastry filling composition comprises interposing between the dough and the filling composition a thin coherent layer of an edible and normally non-liquid fat. In one specific embodiment of the invention, the protective fat layer may be applied by chilling the dough below ambient room temperature prior to its incorporation in a pastry product and by then applying to that surface of the chilled dough which is to be adjacent the filling composition a coating of the fat in its molten condition, the molten fat being solidified by contact with the chilled dough and thereby forming a thin coherent protective layer of the fat between the dough and the filling composition.

The novel unbaked pastry product of my invention comprises a pastry filling composition and a layer of pastry dough in contact therewith, the dough being protected while in its unbaked condition against deterioration resulting from contact with the filling composition by the presence therebetween of a thin coherent layer of an edible and normally non-liquid fat. The dough in contact with the filling composition may comprise a supporting shell-like form as in the case of tarts and open-top pies, or it may comprise only a cover element as in the case of meat pies and deep-dish fruit pies, or it may comprise a complete enclosure for the filling composition as in the case of a turnover or a two-crust pie. Thus, in an unbaked pie embodying my invention and comprising a lower pastry dough layer, a filling composition positioned thereon, and an upper layer of pastry dough positioned over the filling and sealed in contact with the peripheral extremity of the lower dough layer, the two dough layers are protected against the aforementioned deterioration while in their unbaked condition by the presence on the surfaces of the dough layers adjacent the filling composition of a thin coherent layer of an edible and normally non-liquid fat.

The pastry products to which the present invention relates are those, as indicated hereinbefore, generally referred to as pies, tarts, turnovers, and the like, characterized by a filling composition partly or completely enclosed with that type of dough known as pastry dough. The filling composition may be of any conventional type. For example, the filling may be composed essentially of fruit or it may be of a gelatin base. The filling may also be composed of a mixture of meat, vegetables and meat stock as in the case of meat pies and the like. In short, virtually any filling may be used which has heretofore been embodied in a food product covered with, or supported or enclosed by a layer of pastry dough, all such fillings being characterized by an appreciable moisture or aqueous liquid content. If the filling composition is of such a nature as to require refrigeration for its preservation, the unbaked pastry product embodying my invention may be maintained under refrigeration during distribution, sale and storage with the assurance that the pastry dough will retain its original quality and freshness.

The moisture-resistant layer of edible material which I have found to be pre-eminently satisfactory in the practice of my invention comprises any edible and normally non-liquid fat or its equivalent. Those normally non-liquid fats generally referred to in the baking art as dough shortenings are, as a class, wholly suitable for use in practicing the invention. Although the fat may be applied to the dough in the semi-solid condition, facility of application favors the use of such film-forming fats while in their molten or liquid condition. A wide variety of edible and normally non-liquid fats, of both natural and synthetic origin, are available. For example, lard, beef fat, cocoa butter, coconut oil "stearine" (having a melting point of about 26–30° C.), palm kernel "stearine" and butter are illustrative of natural or quasi natural animal and vegetable fatty materials which can be used with advantage in practicing the invention. Synthetic fats suitable for use in practicing my invention include margarine, partly or completely hydrogenated vegetable oils such as hydrogenated cotton seed oil, hydrogenated sesame oil and hydrogenated peanut oil, the mono- and di-glycerides of fatty acids such as glycol monococate (an edible monoester of coconut fat acids), edible glycerol monostearate, glycerol monooleate and the monoglyceride of $C_{12}$ fatty acids (a product which melts at about 53–54° C.), propylene glycol alkylates such as propylene stearate and propylene glycol monostearate, the mannitan alkylates such as mannitan monostearate and mannitan monopalmitate, sorbitan alkylates such as sorbitan monopalmitate, and edible hydrophilic colloids such as the higher acyl derivatives of polyhydroxy alcohols and ethers. Standard compound, a shortening comprising a vegetable oil compounded with a relatively solid fat such as oleo stearine or a hydrogenated oil product, may be used with particular advantage. The aforementioned fats vary in their normal consistency from that of a pasty grease to a relatively firm waxy solid and have melting points above room temperature but below the temperature to which a pie is raised in the course of baking. All of the foregoing edible and normally non-liquid fats are capable of providing a moisture-resistant barrier between an unbaked pastry dough and the filling in contact therewith, the barrier being removed in the course of baking by melting and its resulting absorption in the molten condition either by the dough or by the filling, or by both. When a fat is thus melted and is absorbed by the dough, the absorbed fat functions as additional shortening for the dough and improves the quality of the resulting pastry crust. Although the fat applied to the pastry dough layer in accordance with the invention may be depended upon as a calculable amount of the necessary dough shortening, the amount of fat applied as a protective layer on the dough may be so small in relation to the mass of the dough layer as to be merely a lagniappe insofar as the shortening component of the dough is concerned.

The moisture-resistant layer of fat or the like may be applied to the pastry dough in any suitable manner consistent with the physical condition of the fat. For example, in the case of fats which are normally of the consistency of a pasty grease, the fat may be applied to the dough layer by an applicator which imparts from the face of the applicator to the dough the desired layer of the fat. Relative movement of the applicator and the dough layer will, in such an event, insure uniform distribution of the fat over the dough layer with the resulting production of a coherent layer of the fat over the dough surface. In using fats which have a suitably low melting or liquefying temperature, and particularly such fats having a melting point within the range of about 30° to about 100° C., the fat may be melted and applied either by brushing or by spraying onto the surface of the dough layer to be protected. Fats having a melting point appreciably above the lower limit of the aforesaid range may be applied to the dough layer while the dough is at substantially room temperature. However, those fats having melting points closely approaching the lower limit of the aforesaid range generally require pre-chilling of the dough layer before application of the molten fat thereto in order to insure freezing of the fat promptly upon its contact with the dough and to thereby prevent absorption of the fat by the dough to the exclusion of the formation of a protective layer of the fat. Regardless of the method of application of the fat to the dough, the conditions should be such that a relatively thin coherent layer of non-liquid (i. e. solid or semi-solid) fat is provided on the surface of the dough. Provided the fat layer is coherent, that is if it is continuous and not so thin as to have pin holes or other open areas which would fail to protect the dough layer, there is no significant limit to the thinness of such a layer which can be used successfully in practicing the invention.

The layer or coating of the moisture-resistant fat should extend over the entire surface of the dough layer which is to come into contact with the pastry filling. On the other hand, those portions of the dough layer which will not come into contact with the filling but which will be brought into contact with one another in the final pastry sealing operation should be left uncoated and free of the fat. For example, in making a double-crust pie, the fat should be applied to the upper surface of the lower dough layer and to the lower surface of the upper dough layer so as to protect these layers from the deteriorative influence of the pie filling but should not be applied to the annular extremities of the two coated surfaces so that these annular areas may be joined together with a conventional water seal.

In addition to the protection of the unbaked pastry dough from deterioration by contact with the filling, I have found that a similar layer of the fat applied to those surfaces of the dough which are exposed to the atmosphere will further prevent deterioration of the dough by dehydration. For example, with a pie product which is marketed while contained in a metallic pie tin, or in a metallic foil-line or other pie plate of air-impervious material, but not sealed in an outer moisture-proof container, I have found it advantageous for this purpose to apply the external coating of fat only to the upper surface of the upper dough layer and around the seal adjacent the circumferential edge of the pie. On the other hand, if the pie is similarly marketed while supported in a porous fibrous pie plate (such as a porous paper plate), it is advantageous to coat the exterior surface of the bottom dough layer with a protective layer of the fat. It will be appreciated, however, that if the pastry product is marketed in a moisture-proof container it need not be coated on any of its exterior surfaces.

The method of the present invention may be illustrated, but is not to be limited, by the following specific examples which are directed to the making of a pie which is capable of being distributed and marketed at ambient temperatures (i. e. without refrigeration) in the unbaked condition without danger of deterioration of the pastry dough component thereof by absorption of moisture from the pastry filling composition.

I

The pastry dough was of conventional composition and was rolled to conventional thickness. A single layer of the rolled dough was placed in the bottom of a pie tin to form the bottom dough layer for the pie. A second layer of dough rolled to the same thickness was then cut to such size as to provide the upper pastry covering for the pie. In one modification of my procedure, both layers were placed in a refrigerator maintained at a temperature of about 45–50° F. for a sufficient period of time for the dough layers to be chilled to approximately the refrigerator temperature, and in another modification the dough layers were not chilled. The protective layer of fat was applied to the two chilled and non-chilled dough layers by melting a commercial brand of hydrogenated vegetable oil ("Crisco") and by then brushing the resulting liquefied fat over the exposed surfaces of the bottom and upper dough layers. The annular portion of the bottom dough layer and of the upper dough layer corresponding to those portions which overlay the rim of the pie tin were left uncoated. The thin coating of liquid fat thus applied to the surfaces of the dough layers congealed promptly (more promptly, of course, when applied to the chilled dough layers) so as to leave a thin coherent layer of the fat on those portions of the two dough layers which would subsequently be exposed to contact with the pie filling. A chilled fruit pie filling was then placed in the pie form comprising the bottom dough layer, and the uncoated pie rim was moistened with water. The upper dough layer was subsequently removed from its supporting surface, was turned upside down and was then placed on top of the filled pie form. The adjoining uncoated surfaces of the lower and upper dough layers adjacent the rim of the pie tin were sealed by pressing the two layers together. The resulting product was then ready for moisture-proof packaging and distribution to the consumer with the assurance that there would be no discernible deterioration in the quality of the pie dough in its unbaked state for a matter of days if kept at room temperature or for a matter of weeks if kept under refrigeration in a store or home.

II

Another pie was prepared by this same procedure except that it was made amenable to distribution in a package which was not necessarily moisture-proof by brushing a layer of the same melted fat onto the upper surface and edges of the pie, the bottom exterior surface of the pie being protected by the pie tin against atmospheric dehydration.

The keeping qualities of pies made in accordance with the present invention are illustrated by the following tests:

III

A pie prepared as described hereinbefore in which the filling (comprising about 25% by volume of juice) was made from canned blueberries, was kept in a refrigerator at a temperature of 46–50° F. for about five and one-third days. At the end of this test period, the pie was cut open and inspection of the dough layers showed absolutely no evidence of penetration of the filling juice into either the top or bottom dough layers.

IV

The ability of a coating of the fat to protect the pie filling from excessive oxidation was illustrated by making a pie as described hereinbefore wherein the filling itself, comprising freshly sliced apples, was further provided on its upper surface with a coating of the same fat. The unbaked pie was kept at room temperature (about 70° F.) for three and one-quarter days. At the end of this period, the pie was opened and the slices of apple throughout the entire filling were observed to show no signs of discoloration resulting from oxidation.

V

The protection of the filling from oxidation and the protection of the dough layers from absorption of filling moisture were both well illustrated by preparing four pies by the procedure set forth in Example II in which the filling comprised canned peaches and their juice, the juice being dyed green with vegetable coloring to facilitate tracing its penetration (if at all) into the pie dough layers. Two such pies were immediately placed under refrigeration where they were maintained at a temperature of about 46–50° F., and the other two pies were allowed to stand at room temperature (about 70° F.). At the expiration of seven days of storage under the foregoing conditions, the four pies were opened and inspected. There was no evidence whatsoever of discoloration of the fruit by oxidation, of the absorption of filling juices by the pastry dough, or of dehydration of the exposed surface of the upper layer of pie dough.

It will be seen, accordingly, that it is now possible, by the practice of my invention, to produce an unbaked pie or similar pastry product which is capable of being distributed and marketed to the consumer for subsequent baking in the home without interim deterioration of the pastry dough resulting from absorption by the latter of moisture from the pastry filling. The pastry products of my invention thus make available to the consumer a complete but uncooked pie or the like which can be baked in the home at will to obtain the freshness of flavor and crispness of crust characteristic of home prepared and baked pastries.

I claim:

1. The method of protecting unbaked pastry dough from deterioration resulting from contact with a pastry filling composition for a period of days at room temperature which comprises interposing between the dough and the filling composition a thin coherent layer of an edible fat which is substantially non-liquid at room temperature.

2. The method of protecting unbaked pastry dough from deterioration resulting from contact with a pastry filling composition for a period of days at room temperature which comprises applying to the surface of the dough adjacent the filling composition but prior to contact therewith a thin coherent layer of an edible moisture-impervious material which is substantially non-liquid at room temperature.

3. The method of protecting unbaked pastry dough from deterioration resulting from contact with a pastry filling composition for a period of days at room temperature which comprises applying to the surface of the dough adjacent the filling composition but prior to contact therewith a thin coherent layer of a normally non-liquid dough shortening.

4. The method of protecting unbaked pastry dough from deterioration resulting from contact with a pastry filling composition for a period of days at room temperature which comprises chilling the dough below ambient room temperature prior to bringing the filling composition into contact with the dough, and applying to the surface of the chilled dough which is to be adjacent to filling composition a coating of a molten edible fat which is substantially non-liquid at room temperature whereby the molten fat is caused to solidify upon contact with the dough and thereby form a thin coherent protective layer thereof between the dough and the filling composition.

5. The method of protecting an unbaked pastry product composed of pastry dough and a filling composition from deterioration resulting from prolonged contact of the dough with the filling composition and with the atmosphere which comprises chilling the unbaked pastry dough below ambient room temperature prior to bringing the filling composition into contact therewith, applying to the surface of the chilled pastry dough which is to be adjacent the filling composition a coating of a molten edible fat which is substantially non-liquid at room temperature whereby the molten fat is caused to solidify upon contact with the dough and thereby form a thin coherent protective layer of said fat between the dough and the filling composition, bringing together the thus-treated dough and the filling composition in a form such as to be ready for baking, and applying to the exterior surface of the dough of said form in contact with the ambient atmosphere a similar protective layer of said fat.

6. In the method of producing a pie wherein a pie filling composition is introduced into a pie form composed essentially of pastry dough and an upper layer of pastry dough is positioned over said filling in sealed contact with the peripheral extremity of said dough form, the improvement which comprises protecting the upper and lower layers of the dough from deterioration resulting from prolonged contact with the filling composition in the unbaked condition by applying to the surfaces of the layers prior to the filling composition being brought into contact therewith a thin coherent layer of an edible fat which is substantially non-liquid at room temperature.

7. An unbaked pastry product the dough of which, when baked after standing for days at room temperature in contact with the pastry filling, has substantially the same quality and freshness as if baked immediately after being made, said product comprising a pastry filling composition and a layer of pastry dough in contact therewith, the dough being protected while in its unbaked condition against deterioration resulting from contact with said filling composition for a period of days at room temperature by the presence therebetween of a thin coherent layer of an edible fat which is substantially non-liquid at room temperature.

8. An unbaked pastry product the dough of which, when baked after standing for days at room temperature in contact with the pastry filling, has substantially the same quality and freshness as if baked immediately after being made, said product comprising a pastry filling composition and a layer of pastry dough in contact therewith, the dough being protected while in its unbaked condition against deterioration resulting from contact with said filling composition for a period of days at room temperature by the presence on the surface of the dough layer adjacent the filling composition of a thin coherent layer of an edible moisture-impervious material which is substantially non-liquid at room temperature.

9. An unbaked pastry product the dough of which, when baked after standing for days at room temperature in contact with the pastry filling, has substantially the same quality and freshness as if baked immediately after being made, said product comprising a pastry filling composition and a layer of pastry dough in contact therewith, the dough being protected while in its unbaked condition against deterioration resulting from contact with said filling composition for a period of days at room temperature by the presence on the surface of the dough layer adjacent the filling composition of a thin coherent layer of a normally non-liquid dough shortening.

10. An unbaked pastry product the dough of which, when baked after standing for days at room temperature in contact with the pastry filling, has substantially the same quality and freshness as if baked immediately after being made, said product comprising a pastry filling compositioin and a layer of pastry dough in contact therewith, the dough being protected while in its unbaked condition against deterioration resulting from contact with said filling composition for a period of days at room temperature by the presence on the surface of the dough layer adjacent the filling composition of a thin coherent layer of an edible fat which is substantially non-liquid at room temperature, and the dough layer being protected against dehydration by the presence on the exterior surface of said layer in contact with the ambient atmosphere of a similar layer of said fat.

11. An unbaked pie the dought of which, when baked after standing for days at room temperature in contact with the pastry filling, has substantially the same quality and freshness as if baked immediately after being made, said pie comprising a lower layer of pastry dough, a filling composition positioned on the lower dough layer, and an upper layer of pastry dough positioned over said filling and sealed in contact with the peripheral extremity of the lower dough layer, the upper and lower dough layers being protected while in their unbaked condition against deterioration resulting from contact with said filling composition for a period of days at room temperature by the presence on the surfaces of the dough layers adjacent the filling composition of a thin coherent layer of an edible fat which is substantially non-liquid at room temperature.

12. An unbaked pie the dough of which, when baked after standing for days at room temperature in contact with the pastry filling, has substantially the same quality and freshness as if baked immediately after being made, said pie comprising a lower layer of pastry dough, a filling composition positioned on the lower dough layer, and an upper layer of pastry dough positioned over said filling and sealed in contact with the peripheral extremity of the lower dough layer, the dough being protected while in its unbaked condition against deterioration resulting from contact with said filling composition for a period of days at room temperature by the presence on the surfaces of the dough layers adjacent the filling composition of a thin coherent layer of a normally non-liquid dough shortening, and the dough being protected against dehydration by the presence on the exterior surfaces of said dough layers in contact with the ambient atmosphere of a similar layer of said dough shortening.

NATHANIEL A. HANAU.

REFERENCES CITED

The following references are of record in the file of this patent:

UNITED STATES PATENTS

| Number | Name | Date |
|---|---|---|
| 1,546,820 | Ballard | July 21, 1925 |

FOREIGN PATENTS

| Number | Country | Date |
|---|---|---|
| 21,092 | Great Britain | of 1905 |

OTHER REFERENCES

Lord: Everybody's Cook Book, 1924 ed., Henry Holt & Co., page 592.